United States Patent Office 3,077,440
Patented Feb. 12, 1963

3,077,440
PROCESS FOR SEPARATING EPICHLORHYDRIN FROM MIXTURES
Hans Anselm, Grafelfing, near Munich, and Jürgen Smidt, Munich-Solln, Germany, assignors to Consortium für Elektrochemische Industrie G.m.b.H., Munich, Germany, a corporation of Germany
No Drawing. Filed Aug. 26, 1958, Ser. No. 757,197
6 Claims. (Cl. 202—42)

This invention relates to separating epichlorhydrin from mixtures of epichlorhydrin and carboxylic acids, and it has for its object to provide a novel and improved process for this purpose.

Another object of the invention is to provide an efficient and economical process of the type specified, in which both the epichlorhydrin and the carboxylic acid are recovered in high yield.

Various other objects and advantages will be apparent as the nature of the invention is more fully disclosed.

The epoxidizing of unsaturated organic compounds is effected preferentially by means of organic peracids, particularly from hydrogen peroxide and glacial acetic acid or peracid produced from acetic anhydride, as far as possible in the absence of water. The use of acetaldehyde monoperacetate for the epoxidizing is also known.

In the application of these processes to the epoxidizing of allylchloride to the technically important epichlorhydrin there is the difficulty of separating the generated epichlorhydrin from the carboxylic acid usually present in excess, and recovering the latter on an economical basis.

A known possibility of separating epichlorhydrin from water-soluble carboxylic acids consists in effecting a phase separation with the addition of large quantities of water, if necessary in the presence of a water-insoluble solvent for epichlorhydrin. The particular shortcoming of this process, however, lies in the fact that the carboxylic acid is obtained in low concentration and it must therefore be either discarded or recovered in an expensive way.

In the case of mixtures which contain epichlorohydrin and acetic acid, a separation of epichlorhydrin by fractionation is not possible, since it forms a single-phase azeotropic distillate with 34.5% acetic acid and 65.5% epichlorhydrin, which boils at 115° C.

We have now found to our surprise that mixtures which contain epichlorhydrin and low molecular carboxylic acids can be advantageously separated by subjecting them to fractional distillation in the presence of a small quantity of water. This distillation may be achieved advantageously by operating at subatmospheric pressure and in a flow-through process.

The water to be applied according to our invention may be added either before or during the distillation. In the fractionation there is distilled in spite of the presence of the carboxylic acid a binary azeotropic mixture from epichlorhydrin and water, which boils, for example, at 60 Torr in the combination of 77.4% epichlorhydrin and 22.6% water and separates after condensation into another phase with 98% epichlorhydrin and 2% water and into a higher phase with 93% water and 7% epichlorhydrin. The quantity of water required for the separation of the epichlorhydrin by distillation amounts, at 60 Torr, theoretically to 29.2% of the epichlorhydrin present. It is also possible, however, to achieve a full separation of the epichlorhydrin from the mixture with a small quantity of water, if the aqueous phase of the azeotropic distillate is refluxed during the distillation, best in the top part of the fractionating column. In the case of sufficient fractionating effect of the column used the binary mixture of epichlorhydrin and water is obtained as distillate, which is, contrary to expectations, practically free from carboxylic acids, although, for example in the presence of acetic acid, a ternary mixture was to be expected.

The delimitation of the water quantity to the smallest measure, which is required for the complete separation of the epichlorhydrin, has the result that the carboxylic acid is recovered in a high percentage, which is a special feature of the invention.

The water addition moreover effects a lowering of the boiling temperature of the epichlorhydrin by about 18° and therefore a reduction of the acylation of the epichlorhydrin, which could cause a considerable decrease of output particularly in the presence of acetic acid.

The reaction of the epichlorhydrin with the carboxylic acid is further reduced according to the invention through effecting the fractionation at reduced pressure, for example at 60 Torr, whereby the boiling point is lowered from 88°/760 mm. to 31–32° C.

By fractionating in a flow-through column the output in epichlorhydrin is increased through the shortening of the heating period. By fractionating in the presence of a small amount of water, particularly at low pressure and in the continuous process it is possible, on the one hand to isolate the epichlorhydrin from a mixture with carboxylic acid with greater purity and good yield, and, on the other hand, to recover the carboxylic acid in such purity that it may be used once more, for example for the production of peracids.

Example 1

A mixture of 2 kg. of epichlorhydrin and 8 kg. of acetic acid is mixed before distillation with 600 g. of water and then conducted at about half-height to a suitable vacuum and flow-through column. This is provided with a dephlegmator and separator located underneath the distillation cooler. At 60 Torr, 60° C. still temperature and about 3-fold reflux an azeotropic distillate boiling at 31–32° C. is continuously drawn off, which separates in the separator into two phases. The lower phase consists of 97% epichlorhydrin, 2–3% water and 1% acetic acid. It is possible to convert it through treatment with solid calcium carbonate into pure epichlorhydrin. The upper aqueous phase contains besides water and 7–8% epichlorhydrin also a considerable quantity of acetic acid. It can be used as addition for a new distillation. The acetic acid can be removed from the still in a concentration of more than 95%.

Example 2

7.65 kg. of allylchloride is heated slightly with 9.5 kg. of commercial peracetic acid of about 40% strength manufactured from glacial acetic acid and 98% $H_2O_2$, until it is almost entirely converted. Additionally there are distilled off about 3.8 kg. surplus allylchloride together with 70 g. water at about 400 Torr. The residual reaction mixture contains 7.3 kg. acetic acid, 3.3 kg. epichlorhydrin and 880 g. water. The weight ratio of epichlorhydrin-water is 1:0.267.

The mixture is fractionated at 60 Torr in a flow-through column with a separator. With the correct arrangement of the reversing conditions the azeotropic mixture distills through at 31–32° C. and separates in the separator into the upper water and lower epichlorhydrin phase. Since instead of the 880 g. of water present 965 g. water is required for the complete separation of the epichlorhydrin, the required quantity is made up from the water layer of the separator and is continuously conducted through a siphon to the column. There is obtained 3.2 kg. lower layer with 97–98% epichlorhydrin, 2% water and up to 1% acetic acid, which is dried and deacidified by stirring with 100 potassium carbonate. The output in epichlorhydrin is 95%.

There is obtained from the still at 55–60° C. about 7.3 kg. of acetic acid with a small quantity of epichlorhydrin, monochlorhydrinacetate and water.

*Example 3*

For the epoxidizing of allylchloride there is used a solution of acetaldehyde-monoperacetate in glacial acetic acid, which is produced, for example, according to German Patent #730,116.

10.0 kg. of such a solution, which contains 3.6 kg.= 30 mols of percompound, there is added in a stirrer of rustproof steel at 40–50° C. to 4.6 kg. (60 mols) allylchloride. The produced acetaldehyde is carried off over a column. Aftre the consumption of the percompound the allylchloride is distilled off at 400 Torr.

The residue contains 8.5 kg. of acetic acid and 2.2 kg. of epichlorhydrin. There is mixed with it 0.4 kg. water and fractionation is performed at 60 Torr, as in Example 1. Since for the complete separation of the epichlorhydrin there is required 0.65 kg. of water, 260 g. is continuously withdrawn from the water layer of the separator (which contains 93% of water) by means of the siphon. The aggregate acetic acid is obtained from the still in a concentration of at least 95%.

*Example 4*

12.0 kg. of 15% perpropionic acid, which is obtained through the introduction of dry air into pure propionic acid with irradiation with U.V. light, are mixed with 1.54 kg. of allylchloride while cooling and stirring. The mixture is held at 40–50° C. until the complete elimination of the peracid and then separated by distillation at about 420 Torr from the excess allylchloride.

There is added to the residual mixture of 11.6 kg. propionic acid and 1.4 kg. of epichlorhydrin 0.42 kg. of water or 0.45 kg. of aqueous layer, which contains 7% epichlorhydrin. The mixture is then fractionated at a boiling temperature of 31–32° C./60 Torr in an ordinary column provided with dephlegmator, cooler and separator.

The epichlorhydrin is obtained in the separator as low phase with about 2% of water, which is free from propionic acid. The propionic acid remaining in the still is practically free from epichlorhydrin and water. It may be used again for the production of perpropionic acid.

The invention claimed is:

1. Process for separating epichlorhydrin from a mixture containing epichlorhydrin and a carboxylic acid, which comprises subjecting said mixture to fractional distillation in the presence of water in an amount substantially less than the amount of epichlorhydrin in said mixture.

2. Process for separating epichlorhydrin from a mixture containing epichlorhydrin and a carboxylic acid, which comprises subjecting said mixture to fractional distillation in the presence of water in an amount not greater than 30 parts of water to 100 parts of epichlorhydrin.

3. Process according to claim 2, in which the distillation is performed at a reduced pressure of about 60 Torr.

4. Process according to claim 2, in which the water distilled off in the process is conducted back, at least in part, to the distillation zone.

5. Process according to claim 2, in which the distillative separation of the epichlorhydrin and carboxylic acid is performed in a flow-through column.

6. Process for separating epichlorhydrin from a mixture of epichlorhydrin and acetic acid, which comprises subjecting said mixture to fractional distillation in the presence of water in an amount not greater than 30 parts of water to 100 parts of epichlorhydrin, thereby separating an azeotropic mixture of epichlorhydrin and water from the acetic acid, and then separating the components of said azeotropic mixture.

References Cited in the file of this patent

UNITED STATES PATENTS

| | | |
|---|---|---|
| 1,676,700 | Lewis | July 10, 1928 |
| 2,458,484 | Terry et al. | Jan. 4, 1949 |
| 2,883,398 | Frostick et al. | Apr. 21, 1959 |
| 2,898,349 | Zuppinger et al. | Aug. 4, 1959 |
| 2,921,049 | Moroson | Jan. 12, 1960 |

OTHER REFERENCES

Weissberger: "Distillation," 1951, pages 363–368, 378–385.

Horsley: "Azeotropic Data," 1953, pages 6, 7, 47 and 318–320.